(12) United States Patent
Ashida et al.

(10) Patent No.: US 8,315,131 B2
(45) Date of Patent: Nov. 20, 2012

(54) OPTICAL DISC APPARATUS AND BACK OFF CONTROL METHOD FOR OBJECTIVE LENS

(75) Inventors: Akihiro Ashida, Urayasu (JP); Koji Kaniwa, Yokohama (JP); Jinya Ikeda, Kasama (JP); Satoru Moriya, Hadano (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 1877 days.

(21) Appl. No.: 11/496,576

(22) Filed: Aug. 1, 2006

(65) Prior Publication Data

US 2007/0076542 A1      Apr. 5, 2007

(30) Foreign Application Priority Data

Oct. 5, 2005   (JP) ................................. 2005-292159

(51) Int. Cl.
*G11B 7/00* (2006.01)
(52) U.S. Cl. .................................... 369/44.25; 369/53.2
(58) Field of Classification Search ............... 369/44.23, 369/44.25, 47.1, 53.2, 53.23, 112.23, 44.27, 369/44.32, 70
See application file for complete search history.

(56) References Cited

U.S. PATENT DOCUMENTS

| | | | | | |
|---|---|---|---|---|---|
| 5,140,575 | A | * | 8/1992 | Fushiki ...................... | 369/44.32 |
| 5,224,083 | A | * | 6/1993 | Wakabayashi et al. ..... | 369/44.27 |
| 2001/0030915 | A1 | * | 10/2001 | Suzuki ....................... | 369/44.29 |
| 2002/0154582 | A1 | * | 10/2002 | Yonezawa et al. ......... | 369/44.27 |
| 2002/0159343 | A1 | * | 10/2002 | Fujimoto ................... | 369/44.28 |
| 2003/0123354 | A1 | * | 7/2003 | Takahashi .................. | 369/53.2 |
| 2004/0095858 | A1 | * | 5/2004 | Choi et al. ................. | 369/44.29 |
| 2005/0047313 | A1 | * | 3/2005 | Saitoh et al. .............. | 369/112.05 |
| 2006/0092782 | A1 | * | 5/2006 | Takaba ....................... | 369/44.28 |
| 2006/0120229 | A1 | * | 6/2006 | Nabeta ....................... | 369/44.27 |
| 2006/0158987 | A1 | * | 7/2006 | Jodorkovsky et al. ....... | 369/53.2 |
| 2007/0019523 | A1 | * | 1/2007 | Baba .......................... | 369/47.53 |

FOREIGN PATENT DOCUMENTS

| | | |
|---|---|---|
| JP | 09-259444 | 10/1997 |
| JP | 10-112035 | 4/1998 |
| JP | 11-7633 | 1/1999 |
| JP | 11-191223 | 7/1999 |
| JP | 2000-222744 | 8/2000 |
| JP | 2002-133687 | 5/2002 |

(Continued)

OTHER PUBLICATIONS

Patent Abstract of Japan; JP Publication 08-203108; inventor: Yoshioka Hiroshi.*

(Continued)

*Primary Examiner* — Wayne Young
*Assistant Examiner* — Dionne Pendleton
(74) *Attorney, Agent, or Firm* — McDermott Will & Emery LLP (57) ABSTRACT

In an optical disc apparatus, when a signal to be generated corresponding to an amount of reflected light from an optical disc has a signal level below a threshold level for a period exceeding a reference period, a controller controls an actuator to move an objective lens in a direction such that a distance from the optical disc surface to the objective lens increases. The reference period may be set based on a type of the optical disc and a recording or reproducing speed of the optical disc, or based on a surface deflection of the optical disc.

8 Claims, 6 Drawing Sheets

FOREIGN PATENT DOCUMENTS

| | | |
|---|---|---|
| JP | 2002-312953 | 10/2002 |
| JP | 3380832 | 12/2002 |
| JP | 2003-242657 | 8/2003 |
| JP | 2005-71398 | 3/2005 |
| JP | 2005-166088 | 6/2005 |

OTHER PUBLICATIONS

Japanese Office Action issued in Japanese Patent Application No. JP 2005-292159, dated May 19, 2009.

* cited by examiner

FIG. 1

FIG. 2A
FIRST SIGNAL (FOK0)

FIG. 2B
SECOND SIGNAL (FOK1)

FIG. 2C
THIRD SIGNAL (FOK2)

FIG. 2D
FOCUS DRIVE SIGNAL

TIME t

| Twait ($\times 10^{-6}$ s) | 500 | | 400 | | 300 | | 200 | | 100 | |
|---|---|---|---|---|---|---|---|---|---|---|
| SURFACE DEFLECTION ($\times 10^{-6}$ m) | TIME t ($\times 10^{-6}$ s) | MINIMUM y−x ($\times 10^{-6}$ m) | TIME t ($\times 10^{-6}$ s) | MINIMUM y−x ($\times 10^{-6}$ m) | TIME t ($\times 10^{-6}$ s) | MINIMUM y−x ($\times 10^{-6}$ m) | TIME t ($\times 10^{-6}$ s) | MINIMUM y−x ($\times 10^{-6}$ m) | TIME t ($\times 10^{-6}$ s) | MINIMUM y−x ($\times 10^{-6}$ m) |
| 500 | 800 | −2.0 | 1100 | −11.0 | 1300 | 40.1 | 1100 | 101.5 | 900 | 154.4 |
| 400 | 1100 | −3.0 | 1100 | 53.2 | 1000 | 107.8 | 800 | 153.2 | 500 | 186.1 |
| 300 | 1000 | 60.8 | 900 | 109.2 | 700 | 148.9 | 500 | 178.1 | 300 | 195.1 |
| 200 | 800 | 107.2 | 700 | 143.3 | 500 | 170.3 | 300 | 189.1 | 200 | 197.9 |
| 100 | 600 | 136.4 | 500 | 162.5 | 400 | 190.4 | 300 | 194.5 | 100 | 199.3 |
| 0 | 400 | 154.7 | 300 | 174.5 | 200 | 188.6 | 100 | 197.2 | 100 | 200.0 |

FIG. 5

OPTICAL DISC APPARATUS AND BACK OFF CONTROL METHOD FOR OBJECTIVE LENS

CLAIM OF PRIORITY

The present application claims priority from Japanese application serial No. P2005-292159, filed on Oct. 5, 2005, the content of which is hereby incorporated by reference into this application.

BACKGROUND OF THE INVENTION

1. Technical Field of the Invention

The present invention relates to a back off control technology for an objective lens of an optical pick up when defocusing occurs in an optical disc apparatus.

2. Description of the Related Art

With the recent advances in high-density recording technology for optical discs, an increasing number of optical disc apparatuses use the optical system with a lens numerical aperture larger than that of the CD/DVD optical system in the conventional technology. When the lens numerical aperture is increased, a working distance (hereinafter referred to as a WD) between a surface of an optical disc (hereinafter referred to as an optical disc surface) and an objective lens is shorter, so that the both sides are approaching each other and are likely to come into contact with each other during recording or reproducing. The optical disc surface and the objective lens surface are damaged when contacting each other. For example, in the case of a 3-wavelength optical system that shares CD/DVD optical systems and a blue laser optical system, the WD in the recording or reproduction of a CD is the shortest, so that the optical disc surface and the objective lens surface are likely to contact (abut) each other. Thus, there is required a countermeasure technology that can avoid the contact when defocusing occurs due to an increasing surface deflection of the optical disc or other factors.

There are technologies relating to the above-described countermeasure technology, which are described in Japanese Patent No. 3380832 and Japanese Patent Publication Laid-Open No. 2005-166088. In JP-B-3380832 there is described a technology that detects a total signal from the reflected light of the optical disc, and makes the objective lens back off in a direction to separate from the optical disc by an actuator when the total signal is smaller than a judgment value. In JP-A-2005-166088 there is described a technology that enables the secure tracking control and focus control by suppressing the influence of the surface deflection of the optical disc. In order to achieve this, the surface deflection of the optical disc is detected by a focus error signal at a lower recording speed, and the amount of applied bias is determined based on the detected surface deflection, and in accordance with a bias signal based on this, a constant distance between the convergence lens and the optical disc is maintained to assure an accurate focus servo also in the case of high-speed recording.

SUMMARY OF THE INVENTION

Of the technologies described above, the technology described in JP-B-3380832 is to separate and make the objective lens back off from the optical disc when the total signal detected by the reflected light of the optical disc is smaller than a judgment value. However, the objective lens could possibly perform the back off operation due to a local failure such as a scratch on the optical disc surface, in addition to the case of defocusing. When the operation is performed, it is necessary to return the objective lens to the original position corresponding to a focus state. Thus, the recording or reproducing operation will be interrupted during this operation. Further, the technology described in JP-A-2005-166088 is a technology to keep the distance constant between the convergence lens (objective lens) and the optical disc to perform an accurate focus servo based on the detected surface deflation, which is not a technology to make the objective lens back off in response to the surface deflection of the optical disc and the like.

Based on the situation of the conventional technologies described above, the problem of the present invention in the optical disc apparatus is to accurately determine defocusing without being affected by a local failure such as a scratch on the optical disc surface, and in the case of the defocusing, to enable the objective lens to back off to a secure position without contacting the objective lens on the optical disc, depending on the performance degradation factors such as the type of the optical disc and the surface deflection of the optical disc.

An object of the present invention is to solve such a problem, and to provide a technology that can improve reliability and usability in the optical disc apparatus by preventing the optical disc surface and objective lens surface from being damaged.

The present invention is a technology that can solve the above-described problem and achieve the above-described object.

In other words, an optical disc apparatus may include an actuator which moves an objective lens relative to an optical disc surface; and a controller which controls the actuator. When a signal to be generated corresponding to an amount of reflected light from the optical disc has a signal level below a threshold level for a period exceeding a reference period, the controller controls the actuator to move the objective lens in a direction such that a distance from the optical disc surface to the objective lens increases. The reference period is set based on a type of the optical disc and a recording or reproducing speed of the optical disc, or the reference period is set based on a surface deflection of the optical disc. The reference period has a time length of the range where at least the objective lens does not contact with the optical disc surface.

DETAILED DESCRIPTION OF THE PREFERRED EMBODIMENT

Hereinafter, a preferred embodiment of the present invention will be described with reference to the accompanying drawings.

Figure 1:
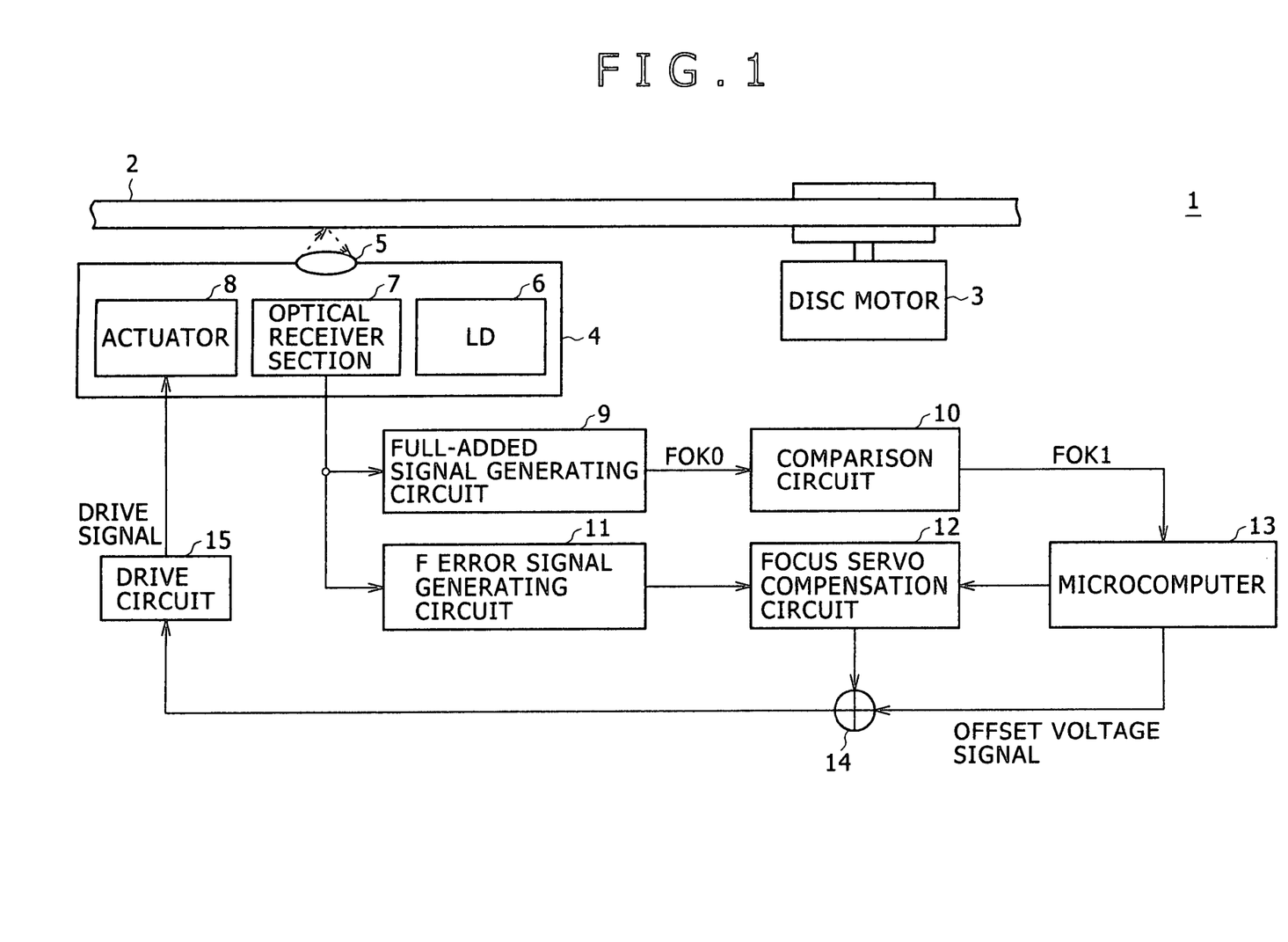
FIG. 1 is a diagram showing a configuration example of an optical disc apparatus as an embodiment of the present invention.
Figure 2A:
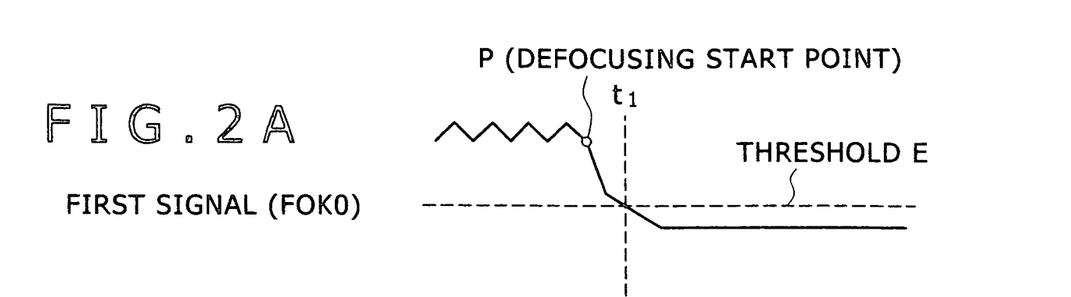
FIG. 2 is a timing diagram illustrating the signal waveforms in a back off operation of an objective lens in the apparatus of FIG. 1.
Figure 2B:
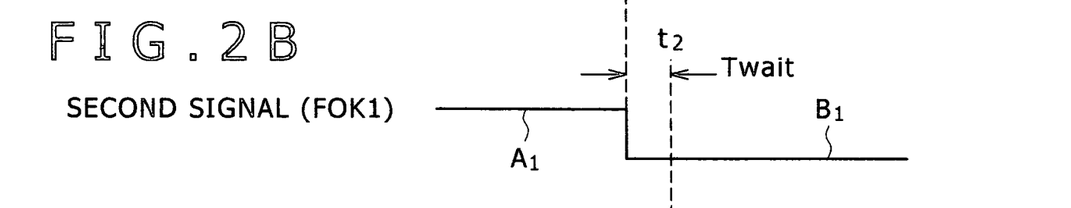
Figures 2C, 2D:
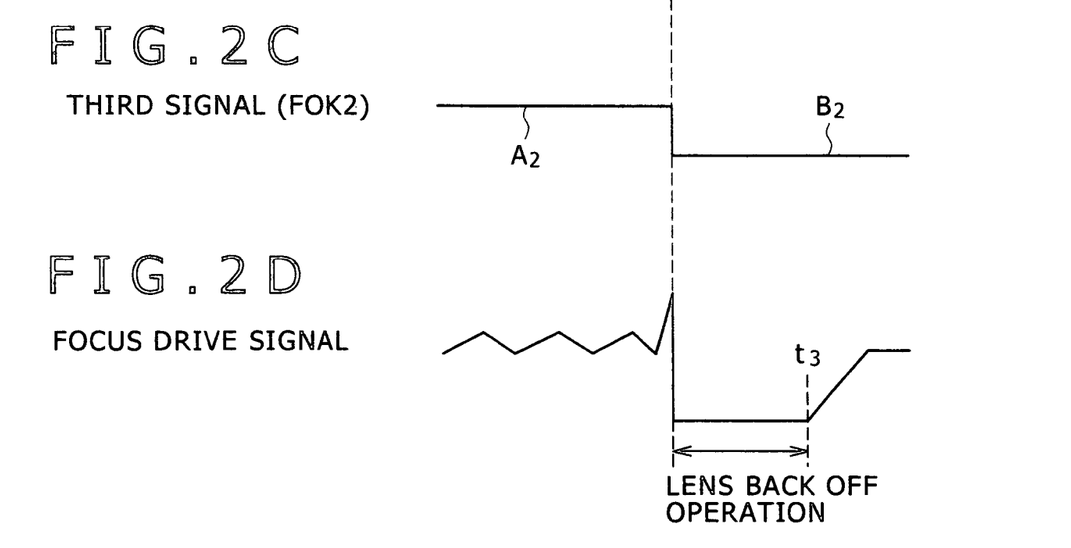
Figure 3:
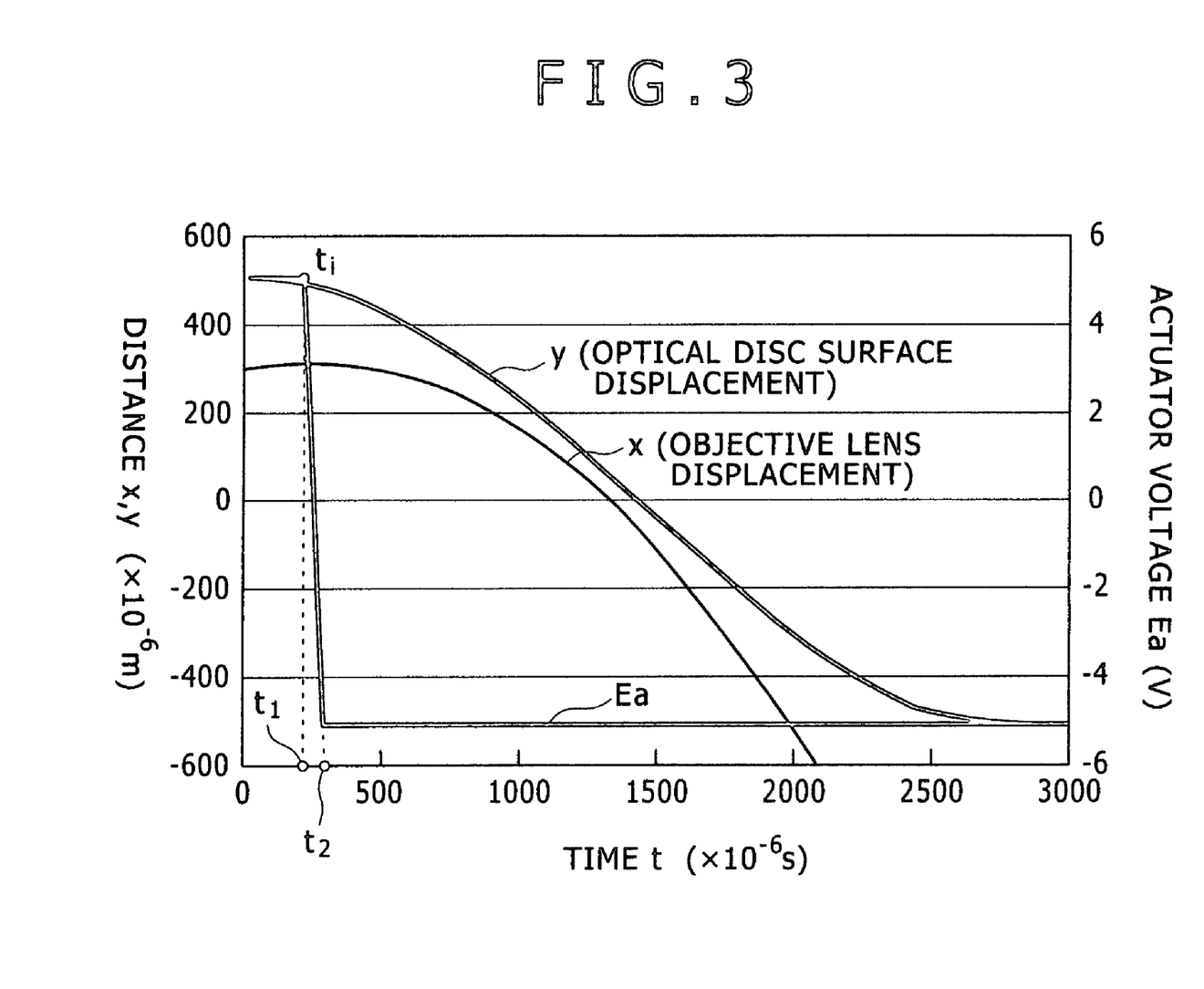
FIG. 3 is a diagram illustrating the displacement of the back off operation of the objective lens upon defocusing.
Figure 4:
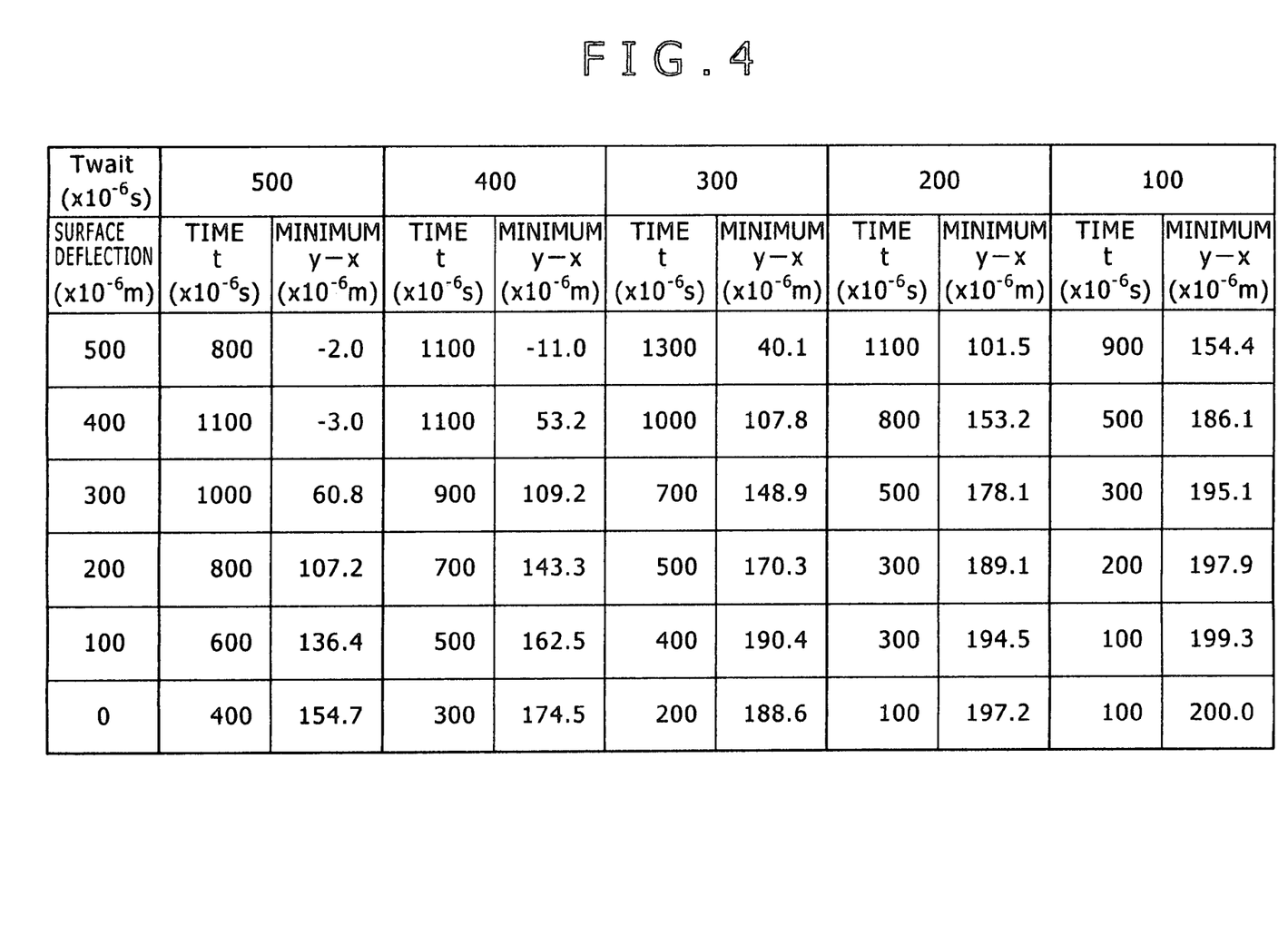
FIG. 4 is an example of a reference waiting time table for determining the defocusing.
Figure 5:
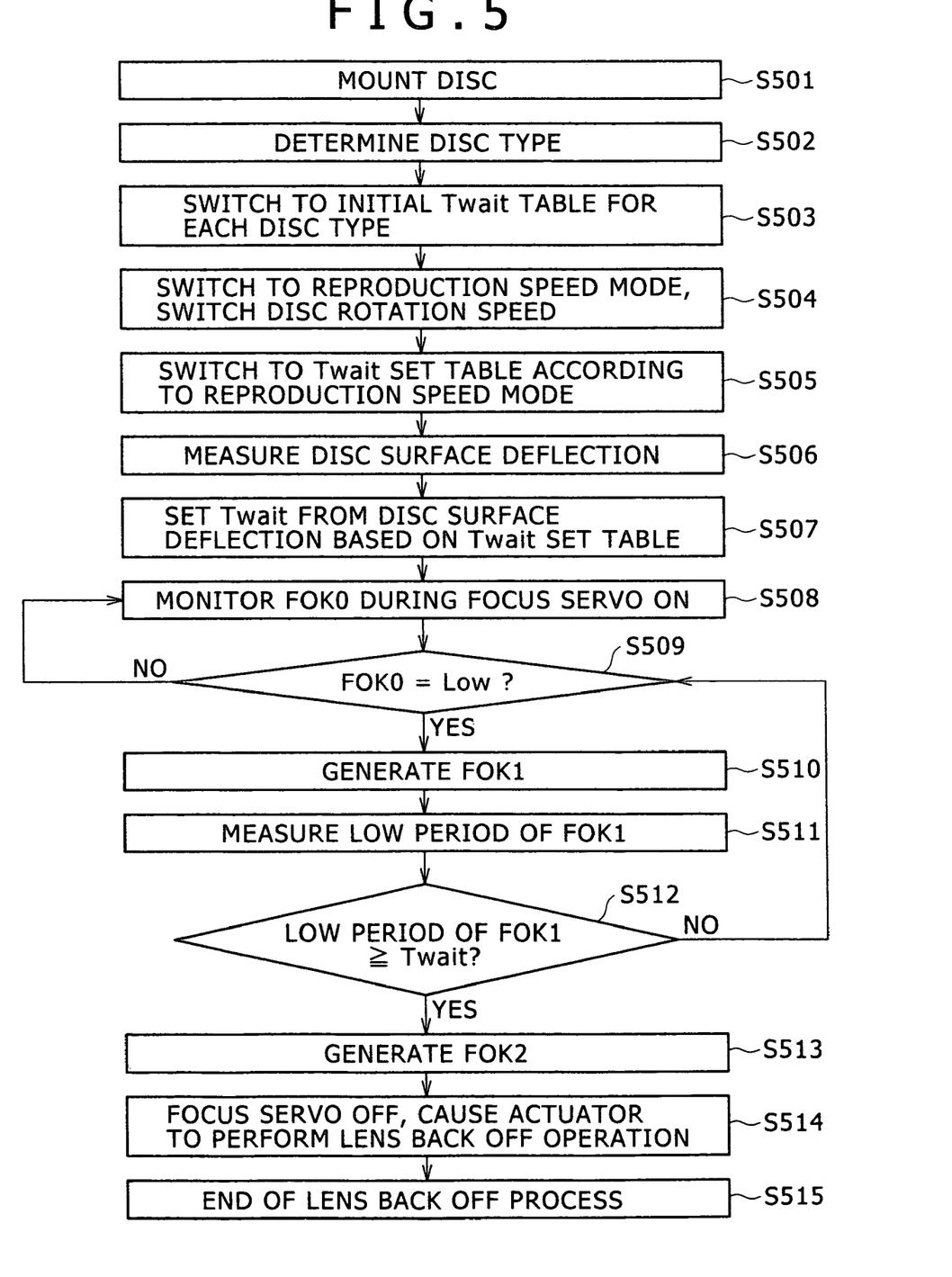
FIG. 5 is a flowchart of the back off operation of the objective lens.
Figures 6A, 6B, 6C:
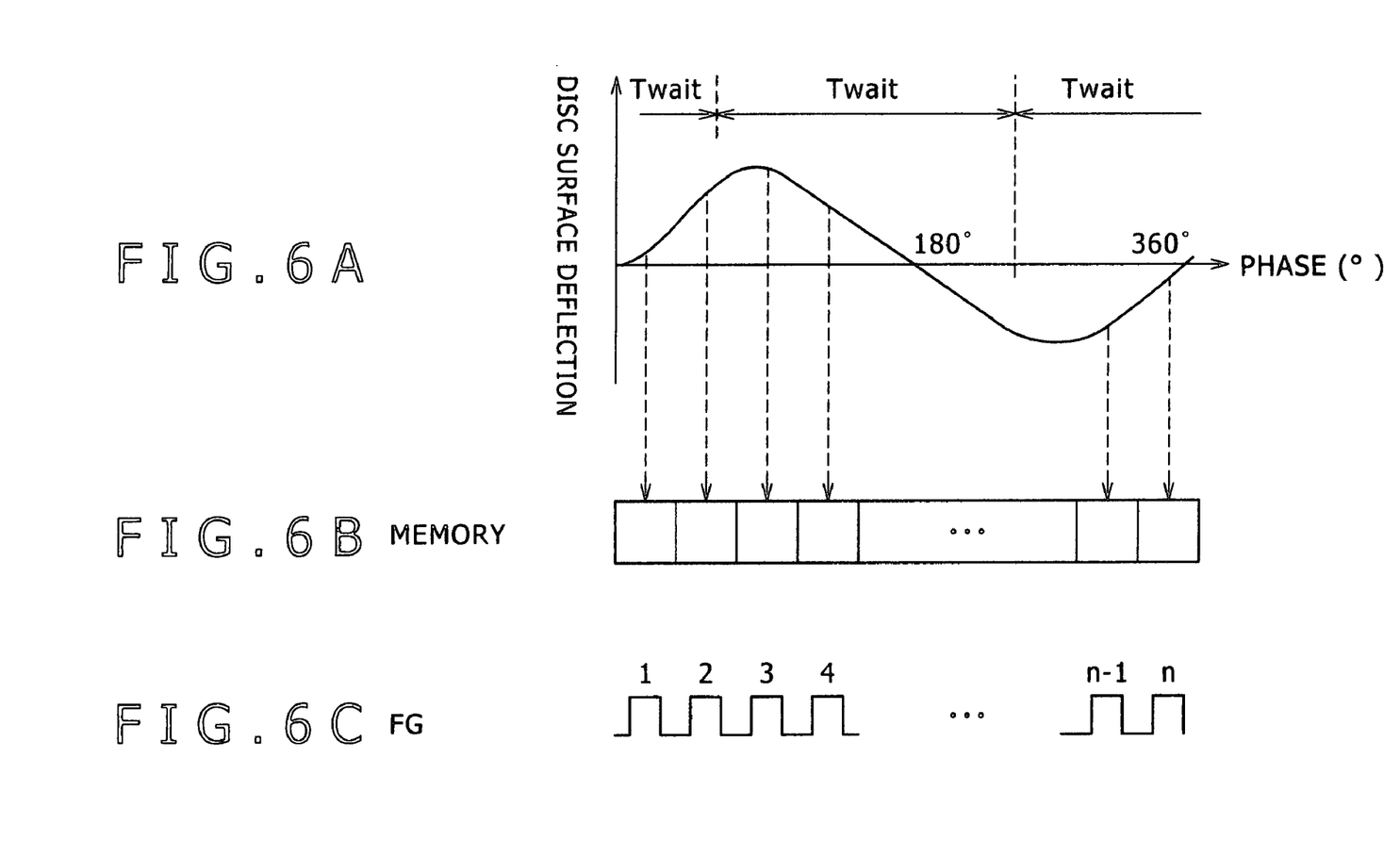
FIG. 6 is an example of a case where the setting of the reference waiting time is changed in response to the rotational phase of an optical disc.

FIGS. 1 to 6 are diagrams illustrating the embodiment of the invention. FIG. 1 is a diagram showing a configuration example of an optical disc apparatus as an embodiment of the present invention. FIG. 2 is a timing diagram illustrating the signal waveforms in a back off operation of an objective lens in the apparatus of FIG. 1. FIG. 3 is a diagram illustrating the displacement of the back off operation of the objective lens upon defocusing. FIG. 4 is an example of a reference waiting time table for determining the defocusing. FIG. 5 is a flowchart of the back off operation of the objective lens. FIG. 6 is an example of a case where the setting of the reference waiting time is changed in response to the rotational phase of an optical disc.

In FIG. 1, reference numeral 1 denotes an optical disc apparatus as the embodiment of the invention. Reference numeral 2 denotes an optical disc. Reference numeral 3 denotes a disc motor for rotating and driving the optical disc 2. Reference numeral 4 denotes an optical pick-up. Reference numeral 5 denotes an objective lens. Reference numeral 6 denotes a laser diode for emitting a laser beam of a predetermined strength for recording or reproduction. Reference numeral 7 denotes an optical receiver section for receiving a reflected laser beam from a recording surface of the optical disc (hereinafter also referred to as an optical disc surface) via the objective lens, converting to an electrical signal and outputting it. Reference numeral 8 denotes an actuator for moving and displacing the objective lens 5 relative to the optical disc surface, as well as changing the posture of the objective lens 5. Reference numeral 9 denotes a full-added signal generating circuit for adding signals output from the optical receiver section 7 and generating a first signal (FOK0 in FIG. 1) as a total signal (full-added signal) corresponding to the amount of the reflected laser beam from the optical disc surface. Reference numeral 10 denotes a comparison circuit as a comparison section for comparing the level of the first signal to a threshold that the objective lens 5 can maintain the focus state (in focus state), and based on a result of the comparison, generating and outputting a signal having a first portion of a level corresponding to the focus state of the objective lens 5 and a second portion of a level corresponding to a defocus state (out-of focus state) as a second signal (FOK1 in FIG. 1). Reference numeral 11 denotes a focus error signal generating circuit for generating and outputting a focus error signal for a focus servo control, from the signal output from the optical receiver section 7. Reference numeral 12 denotes a focus servo compensating circuit for generating and outputting a focus servo control signal and a surface deflection detection signal of the optical disc 2, based on the focus error signal. Reference numeral 13 denotes a microcomputer as a controller for controlling the entire optical disc apparatus 1. Reference numeral 14 denotes an adding circuit for adding a control signal from the microcomputer 13 and the focus servo control signal from the focus servo compensation circuit 12. Reference numeral 15 denotes a drive circuit for generating and outputting a drive signal (focus drive signal) to drive the actuator 8, based on the output signal from the adding circuit 14. The microcomputer 13 as the controller determines whether the continuous time of the second portion of the second signal input from the comparison circuit 10 exceeds the predetermined reference waiting time, and as a result of the determination, when it exceeds the reference waiting time, generates a third signal (FOK2 in FIG. 1) which is an internal signal of the microcomputer 13, and outputs an offset voltage signal as the control signal to make the objective lens back off, to the drive circuit 15 at the timing when the third signal FOK2 is generated. The microcomputer 13 also sets the reference waiting time.

In the above-described configuration, assuming a case where the optical disc 2 is rotated and driven at a predetermined speed by the disc mortar 3, and for example a surface deflection is generated on the optical disc 2 during the reproducing operation causing defocusing. In this case, the signal level of the first signal (FOK0 in FIG. 1) generated in the full-added signal generating circuit 9 decreases. The first signal (FOK0) with the decreased level is input to the comparison circuit 10. Then, the comparison circuit 10 compares the level of the first signal, to the threshold (level) that the objective lens 5 can maintain the focus state (in focus state). As a result of the comparison, when the level of the first signal (FOK0) decreases to below the threshold, the comparison circuit 10 generates a signal having a first portion of a level corresponding to the focus state of the objective lens 5 and a second portion of a level corresponding to the defocus state (out-of focus state), as the second signal (FOK1 in FIG. 1). In other words, the comparison circuit 10 forms the first portion of the level corresponding to the focus state in the second signal (FOK1), for the portion of the period during which the signal level in the first signal (FOK0) exceeds the threshold, namely, the portion of the period with no level decrease and the portion of the period from when the level starts decreasing to when it reaches the threshold, as the portion where the focus state can be maintained. Further, the comparison circuit 10 forms the second portion of the level corresponding to the defocus state in the second signal (FOK1), for the portion of the period during which the signal level in the first signal (FOK0) is below the threshold, as the portion where the focus state cannot be maintained. The second signal (FOK1) is to be a step-like signal, for example, that switches to the second portion when the first portion is at the threshold level. The generated second signal is input to the microcomputer 13 serving as the controller.

The microcomputer 13 detects the surface deflection that occurs on the optical disc 2 (disc surface deflection), based on the focus error signal generated in the focus error signal generating circuit 11. In other words, the focus servo compensation circuit 12 extracts the rotation speed component of the focus error signal, and the microcomputer 13 monitors the extracted output and thereby detects the disc surface deflection.

The microcomputer 13 sets appropriate reference waiting time from a table previously registered in a memory (not shown) within the microcomputer 13, based on the reproduction speed information and on the surface deflection information. The microcomputer 13 determines whether the continuous time of the second portion of the second signal (FOK1) input from the comparison circuit 10 exceeds the specified referent waiting time. As a result of the determination, when the second portion of the second signal (FOK1) exceeds the reference waiting time, the microcomputer 13 generates the third signal (FOK2) as the defocusing occurs. The microcomputer 13 generates the third signal (FOK2) as a signal that the level is switched when the continuous time of the second portion of the second signal (FOK1) exceeds the reference waiting time. The microcomputer 13 does not generate the third signal when the second portion of the second signal (FOK1) is shorter than the reference waiting time. The third signal (FOK2) is generated within the microcomputer 13 and the level of the third signal (FOK2) is switched. At this time, the microcomputer 13 turns the output "OFF" in the focus servo compensation circuit 12, and then outputs to the adding circuit 14 an offset voltage signal to make the objective lens 5 back off. The drive circuit 15 generates a focus drive signal based on the offset voltage signal, and drives the actuator 8 by the generated focus drive signal to make the objective lens 5 back off in a direction where the distance from the optical disc surface increases.

Hereinafter, the components of the optical disc 1 of FIG. 1, which will be used in the description, are designated by the same reference numerals as in FIG. 1.

FIG. 2 is a timing diagram illustrating the signal waveforms in the back off operation of the objective lens 5 in the apparatus of FIG. 1. FIG. 2A shows the waveform of the first signal generated in the full-added signal generating circuit 9 shown in FIG. 1. FIG. 2B shows the waveform of the second signal (FOK1) generated in the comparison circuit 10 shown in FIG. 1. FIG. 2C shows the waveform of the third signal (FOK2) generated in the microcomputer 13 shown in FIG. 1. FIG. 2D shows the waveform of the focus drive signal generated in the drive circuit 15.

For example, when defocusing occurs during the reproduction operation, as shown in FIG. 2A, the signal level of the first signal (FOK0) decreases (the P point represents the start point of defocusing in FIG. 2A). In the comparison circuit 10, the first signal (FOK0) with the decreased level is compared to the threshold (level) E that the objective lens 5 can maintain the focus state (in focus state) (FIG. 2A). As a result of the comparison, when the level of the first signal (FOK0) decreases to below the threshold E (the case of FIG. 2A), the second signal (FOK1) is generated having the first portion $A_1$ of the level corresponding to the focus state of the objective lens 5 and the second portion $B_1$ of the level corresponding to the defocus state (out-of focus state), in a step-like fashion (FIG. 2B). In other words, as shown in FIG. 2B, when the level of the first signal (FOK0) decreases below the threshold E at the time point $t_1$, the second signal (FOK1) is generated in such a manner that the portion of the period before the time point $t_1$ is formed as the first portion $A_1$ corresponding to the focus state, and that the portion of the period after the time point $t_1$ is formed as the second portion $B_1$ corresponding to the defocus state. In other words, the first portion $A_1$ in the second signal (FOK1) is switched to the second portion $B_1$ at the time point $t_1$.

The microcomputer 13 sets the appropriate reference waiting time $T_{wait}$ from the table registered within the memory, compares the sequential continuous time of the second portion $B_1$ of the second signal (FOK1) input from the comparison circuit 10 to the reference waiting time $T_{wait}$, and determines whether the sequential continuous time exceeds the reference waiting time $T_{wait}$. As a result of the comparison, when the sequential continuous time exceeds the reference waiting time $T_{wait}$, the microcomputer 13 generates the third signal (FOK2) as defocusing occurs (FIG. 2C). The first portion $A_2$ of the third signal (FOK2) is formed by the portion of the period before the time point $t_2$ when the sequential continuous time of the second portion $B_1$ of the second signal (FOK1) is equal to or substantially equal to the reference waiting time $T_{wait}$, and when the level is switched. The second portion $B_2$ of the third signal (FOK2) is formed by the portion of the period after the time point $t_2$. At the time point $t_2$ when the level of the third signal (FOK2) is switched, the microcomputer 13 turns the output "OFF" in the focus servo compensation circuit 12, and outputs to the adding circuit 14 an offset voltage signal to make the objective lens 5 back off. The drive circuit 15 generates a focus drive signal based on the offset voltage signal to start driving the actuator by the generated focus drive signal at the time point $t_2$, and thereby to make the objective lens 5 back off in a direction where the distance from the optical disc surface increases, during the period after the time point $t_2$ and before the time point $t_3$ (FIG. 2D). After the time of applied offset (between the time points $t_2$ to $t_3$) has passed for the objective lens 5 to sufficiently back off, the amount of applied offset is gradually reduced to return the objective lens 5 slowly to a neutral point position.

FIG. 3 is a diagram illustrating the displacement of the back off operation of the objective lens 5 upon defocusing, which is a view showing an example of the simulation results for the case of defocusing. The simulation conditions are as follows: the optical disc is a CD; the rotation speed is 48× speed (=175.5 Hz); the disc surface deflection is $\pm 500 \times 10^{-6}$ m; the reference waiting time $T_{wait}$ is $300 \times 10^{-6}$ s; the WD in the normal focus state is $200 \times 10^{-6}$ m; the maximum value of the actuator voltage (the voltage of the focus drive signal applied to the actuator 8) is 5 V; and the minimum value of the actuator voltage is −5 V.

In FIG. 3, the symbol x denotes the displacement amount of the objective lens 5, the symbol y denotes the displacement amount of the optical disc surface, and the symbol Ea denotes the actuator voltage.

For example, when the acceleration sensitivity of the actuator is set to 115 (m/s$^2$)/V, the acceleration of the objective lens 5 in the maximum actuator voltage 5 V is 5×115=575 m/s$^2$. When an offset voltage of 5 V is applied to the actuator during the lens back off operation, the lens behavior can be approximated with a constant acceleration motion of 575 m/s$^2$. Thus, the lens displacement distance after t second(s) with the initial speed set to 0 (zero) is the distance x=575×t$^2$/2. However, it is actually necessary to wait for the offset application in the period of the above-described reference waiting time $T_{wait}$ which is the FOK protection period, by taking into account that the FOK1 signal may be Low due to a scratch made on the optical disc surface, during the period of several hundred microseconds ($10^{-5}$ s) from the time point when the FOK1 signal is Low. Thus, the displacement amount x of the objective lens 5 at this time is obtained as follows:

$$x = 575 \times (t - T_{wait})^2 / 2 \quad \text{(Equation 1)}$$

where t is the time from the time point when the defocusing occurs (t=0) (note that $t \geq T_{wait}$).

Further, the displacement amount y of the optical disc surface is obtained as follows:

$$y = (\text{disc surface deflection}) \times \sin(2\pi f t) \quad \text{(Equation 2)}$$

where f is the rotation frequency of the optical disc.

FIG. 3 shows the state of changes in x, y and the actuator voltage Ea from the time point when the defocusing occurs (t=0), in the case of the disc rotation frequency set to 175.5 Hz (CD 48× speed), the disc surface deflection set to $\pm 500 \times 10^{-6}$ m, and the reference waiting time $T_{wait}$ set to $300 \times 10^{-6}$ s, based on the above-described x and y. In FIG. 3, it is assumed that the focus is out at the time point t=0 when the disc surface deflection is maximum. At the time point when the defocusing occurs (t=0), the WD is $200 \times 10^{-6}$ m, and y−x is also $200 \times 10^{-6}$ m which is equal to the WD. In this simulation, when the defocusing occurs at the time point of t=0, the focus error signal is disturbed due to focus change, for example, based on the impact force and other factors. The maximum actuator voltage (5 V) in the direction to move the objective lens 5 near to the optical disc surface, is applied to the actuator 8 from the time point t=0 to the time point t=$t_1$ immediately before the lens back off occurs. Then, the actuator voltage is switched to the minimum value of −5 V at the time point $t_2$, based on the above-described offset voltage for the lens back off. The time point $t_2$ corresponds to the time point $t_2$ when the level of the third signal (FOK2) is switched in FIG. 2. In FIG. 3, the displacement amount x of the objective lens 5 starts decreasing at least after the time point $t_2$, in other words, it starts increasing in the direction separating from the optical disc surface. Also, the displacement amount y of the optical disc surface varies in the disc rotation period between +500×$10^{-6}$ m and −500×$10^{-6}$ m, due to the surface deflection of the optical disc 2. According to the result of the simulation, y−x is the minimum value of about 40.1×$10^{-6}$ m at the time point of t=1300×$10^{-6}$ s, where the objective lens 5 approaches nearest to the optical disc surface. In the result of the simulation where the factors are not changed except the reference waiting time $T_{wait}$ which is changed to 400×$10^{-6}$ s, y−x is the negative value at the time point t=1100×$10^{-6}$ s, which means that the objective lens 5 contacts (abuts) the optical disc surface.

The simulation is conducted under the condition that the minimum acceptable value of y−x is set to 100×$10^{-6}$ m with the reference waiting time $T_{wait}$ changed. In this case, y−x is the minimum acceptable value at the time point of t=1100×$10^{-6}$ s when $T_{wait}$=200×$10^{-6}$ s. From this result, in the case where the CD is rotated at 48× speed with the disc surface deflection ±500×$10^{-6}$ m, it is necessary for the reference waiting time $T_{wait}$ to be reduced below about 200×$10^{-6}$ s. In an actual case, in addition to the above-described conditions, the disc surface deflection increases due to the surface deflection of a turntable on which the disc is placed, and acceleration or the like occurs in the objective lens 5 due to the impact force applied to the optical disc apparatus 1. Taking these conditions into account, it is necessary for the acceptable maximum value of the reference waiting time $T_{wait}$ to be set to a value less than 200×$10^{-6}$ s. When the disc surface deflection is less than 500×$10^{-6}$ m, the acceptable maximum value of the reference waiting time $T_{wait}$ can be increased more than the above-described value.

FIG. 4 is an example of a reference waiting time table for determining the defocusing, which shows the y−x values and the time points t for each case where the objective lens 5 approaches nearest to the optical disc surface according to the change in the disc surface deflection and the reference waiting time $T_{wait}$. The respective values are determined by the simulation. It is seen from the table values in FIG. 4 that when the disc surface deflection decreases, the acceptable value of the reference waiting time $T_{wait}$ increases. For example, when the disc surface deflection is 500×$10^{-6}$ m and the reference waiting time $T_{wait}$ is 300×$10^{-6}$ s, the y−x value decreases to 40.1×$10^{-6}$ m. While when the disc surface deflection is 400×$10^{-6}$ m and the reference waiting time $T_{wait}$ is still 300×$10^{-6}$ s, a value of 100×$10^{-6}$ m or more is assured as the y−x value. When the disc surface deflection further decreases to 300×$10^{-6}$ m and the reference waiting time $T_{wait}$ increases to 400×$10^{-6}$ s, the y−x value of 100×$10^{-6}$ m or more can be assured. When the disc surface deflection decreases to 200×$10^{-6}$ m and the reference waiting time $T_{wait}$ further increases to 500×$10^{-6}$ s, the y−x value of 100×$10^{-6}$ m or more can be assured as well.

Increasing the acceptable value of the reference waiting time $T_{wait}$ is a condition necessary to ensure particularly that the apparatus does not perform the back off operation of the objective lens 5 based on a scratch or other flaw on the optical disc surface, in other words, that the objective lens 5 does not malfunction (the back off operation) based on a scratch or other flaws. For example, in the case where a scratch of width 3×$10^{-3}$ m is made on the optical disc surface and when the optical disc is rotated at 48× speed, the passing time through the scratch is about 51×$10^{-6}$ s. When the difference between this value and the reference waiting time $T_{wait}$ is small, the third signal (FOK2) (FIG. 2) is incorrectly generated within the microcomputer 13, in addition to the influence of the shape of the scratch and the like. As a result, the objective lens 5 could possibly perform the back off operation. Also from this point of view, it is desirable that the reference waiting time $T_{wait}$ is set to about 200×$10^{-6}$ s or more for the reproduction at the 48× speed.

The table of FIG. 4 as described above is previously registered for each type of optical disc in the memory (not shown) within the microcomputer 13. When defocusing occurs, the microcomputer 13 determines and sets appropriate reference waiting time $T_{wait}$ by computation based on the table from the optical disc type information, the recording or reproducing speed information (double-speed information) and the surface deflection information. When the surface deflection of the optical disc is large, or when the recording or reproducing speed is high, it is necessary to set a shorter time as the reference waiting time $T_{wait}$. On the other hand, when the surface deflection of the optical disc is small, or when the recording or reproducing speed is low, it is possible to set a longer time as the reference waiting time $T_{wait}$.

FIG. 5 is a flowchart of the back off operation of the objective lens when the optical disc apparatus performs a reproducing operation.

In FIG. 5, the operation sequence is as follows:

1. The optical disc 2 is mounted on the optical disc apparatus 1 (Step S501).

2. The microcomputer 13 determines the type of the loaded optical disc (Step S502).

3. The microcomputer 13 switches to the table where the initial reference waiting time $T_{wait}$ for each disc type is set based on a result of the determination in Step S502 (Step S503).

4. The microcomputer 13 switches the reproduction speed, and also switches the rotation speed of the optical disc to a corresponding speed (Step S504).

5. The microcomputer 13 switches to the table where the reference waiting time $T_{wait}$ corresponding to the switched reproduction speed mode is set (Step S505).

6. The rotation speed component of the focus error signal is extracted by the focus servo compensation circuit 12, and the microcomputer 13 detects (measures) the disc surface deflection of the optical disc 2 by monitoring the extracted output (Step S506).

7. The microcomputer sets the reference waiting time $T_{wait}$ from the detected disc surface deflection information as well as the table where the reference waiting time $T_{wait}$ switched in Step S505 is set (Step S507).

8. When the focus servo is in the "ON" state, the comparison circuit 10 monitors the level of the first signal (FOK0) by comparing the level to the threshold E (Step S508).

9. The comparison circuit 10 determines whether the level of the first signal (FOK0) decreases to below the threshold E by the comparison described above (Step S509).

10. As a result of the determination, when the level of the first signal (FOK0) decreases to below the threshold E, the comparison circuit 10 generates the second signal (FOK1) (Step S510). As a result of the determination, when the level of the first signal (FOK0) does not decrease to below the threshold E, the process returns to Step S508 where the comparison circuit 10 monitors the level of the first signal (FOK0).

11. The microcomputer 13 measurers the Low period (second portion $B_1$) of the second signal (FOK1) (Step S511).

12. The microcomputer 13 compares the measured Low period (second portion $B_1$) of the second signal (FOK1) to the predetermined reference waiting times $T_{wait}$, and determines whether the Low period exceeds the reference waiting times $T_{wait}$ (Step S512).

13. As a result of the determination in Step S512, when the Low period of the second signal (FOK1) exceeds the reference waiting times $T_{wait}$, the microcomputer 13 generates the third signal (FOK2) as the defocusing occurs in the objective lens 5 (Step S513). As a result of the determination in Step S512, when the Low period of the second signal (FOK1) does not reach the reference waiting time $T_{wait}$, the process returns to Step S509.

14. The microcomputer 13 turns the output "OFF" in the focus servo compensation circuit 12 when the level of the third signal (FOK2) is switched, and outputs to the adding circuit 14 an offset voltage signal to make the objective lens 5 back off. The drive circuit 15 generates a focus drive signal based on the offset voltage signal, drives the actuator 8 by the generated focus drive signal to cause the objective lens 5 to perform the back off operation (Step S514).

15. After the objective lens 5 has moved to a predetermined back off position, the microcomputer 13 completes the back off operation (Step S515).

FIG. 6 is an example of a case where the disc surface deflection corresponding to the rotational phase position of the optical disc is determined and based on which the setting of the reference waiting time $T_{wait}$ is changed.

In FIG. 6, the rotation angle of the disc motor 3 is detected from the output of a frequency generator (FG) within the disc motor 3, in other words, from the FG pulse as a rotation frequency signal. The disc surface deflection for each of the detected rotation angles is detected from the focus error signal, focus drive signal and the like. Then the detection results are previously stored in the memory within the microcomputer 13 as the phase information of the disc surface deflection. When the defocusing occurs, the disc surface deflection and disc surface displacement direction for each rotation phase position of the optical disc are obtained from the phase information of the disc surface deflection. Then, the reference waiting time $T_{wait}$ of a length corresponding to each of the rotation phase positions is set based on the information obtained as described above. For example, assuming that n FG pulses are generated during one rotation of the disc motor 3, n memories corresponding to the respective FG pulses are provided within the microcomputer 13. The disc surface deflections corresponding to the respective FG pulses are detected by the focus servo compensation circuit 12. Then the detection results are stored in the memories within the microcomputer 13 respectively. When the defocusing occurs, the rotation angle of the disc motor 3 at this time is obtained from the FG pulse. The disc surface deflection corresponding to this is read from the memory. In this manner, a long reference waiting time $T_{wait}$ is set in the phase displaced in the direction where the optical disc separates from the objective lens 5. On the other hand, a short reference waiting time $T_{wait}$ is set in the phase displaced in the direction where the optical disc approaches the objective lens 5. It is possible to determine the reference waiting time $T_{wait}$ from the speed and acceleration of the objective lens 5 at the moment when the defocusing occurs, using the disc surface deflection information stored in the memory within the microcomputer 13.

According to the above-described embodiment of the invention, it is possible to improve the reliability and usability of the optical disc apparatus. In other words, it is designed such that when defocusing occurs in the optical disc apparatus, appropriate reference waiting time $T_{wait}$ is set from the type of the optical disc, the recording or reproduction speed, the disc surface deflection and other factors, and drives the actuator 8 based on the reference waiting time $T_{wait}$. This makes it possible to surely eliminate malfunction in the back off of the objective lens 5 due to a scratch or other flaw on the optical disc surface. In addition, it surely prevents the optical disc surface and the objective lens 5 from contacting each other, so that it is possible to eliminate damage to the optical disc surface and the objective lens 5 caused by the contact.

Further, it is possible for the microcomputer 13 to set the reference waiting time $T_{wait}$ from the distance between the neutral point position and the focal point position in the objective lens 5 as a facture, in addition to the factors including the recording or reproduction speed of the optical disc 2, the surface deflection of the optical disc 2 and the type of the optical disc 2.

Further, it is possible to continuously switch the reference waiting time $T_{wait}$ in such a manner that the microcomputer 13 always computes and determines the appropriate reference waiting time $T_{wait}$ during the recording/reproduction while detecting changes in the recording/reproduction speed from a read channel clock and the like during the reading/reproduction as well as monitoring changes in the disc surface deflection during the recording/reproduction.

The present invention can be applied to other embodiments without departing from the sprit or essential characteristics thereof. Thus, it should be understood that the foregoing description on the embodiment is a mere illustration for implementing the invention, and the invention is in no way limited to this particular embodiment. The scope of the invention is defined by the appended claims. All changes and modifications belonging to equivalents of the claims fall within the scope of the invention.

What is claimed is:

1. An optical disc apparatus for recording or reproducing information to or from an optical disc, comprising:
    an actuator which moves an objective lens relative to an optical disc surface; and
    a controller which controls the actuator, wherein:
    after a type of the optical disc is determined, when a signal to be generated corresponding to an amount of reflected light from the optical disc has a signal level below a threshold level for a period exceeding a reference period, the controller controls the actuator to move the objective lens in a direction such that a distance from the optical disc surface to the objective lens increases; and
    the reference period is set based on information of the type of the optical disc and information of a recording or reproducing speed of the optical disc.

2. The optical disc apparatus according to claim 1, wherein the reference period is set based on information of a surface deflection of the optical disc.

3. The optical disc apparatus according to claim 2, wherein surface deflection of the optical disc is detected based on a focus error signal at each of a plurality of rotation phase positions corresponding to rotation angles of a disc motor that rotates and drives the optical disc, and the reference period is set corresponding to each surface deflection of the optical disc at each of the plurality of rotation phase positions.

4. The optical disc apparatus according to claim 3,
    wherein information on the rotation angle of the disc motor is detected from a rotation frequency signal that the disc motor generates.

5. A control method for moving an objective lens in an optical disc apparatus, comprising the steps of:
    irradiating an optical disc with a laser beam from a laser diode through the objective lens;
    receiving reflected light from the optical disc and generating a signal corresponding to an amount of the reflected light with an optical receiver section;
    controlling an actuator with a controller and moving the objective lens relative to an optical disc surface, wherein:

after a type of the optical disc is determined, when a signal to be generated corresponding to an amount of reflected light from the optical disc has a signal level below a threshold level for a period exceeding a reference period, the controller controls the actuator to move the objective lens in a direction such that a distance from the optical disc surface to the objective lens increases; and the reference period is set based on information of the type of the optical disc and information of a recording or reproducing speed of the optical disc.

6. The control method for moving an objective lens in an optical disc apparatus according to claim 5, wherein the reference period is set based on information of a surface deflection of the optical disc.

7. An optical disc apparatus for recording or reproducing information to or from an optical disc, comprising:

an actuator which moves an objective lens relative to an optical disc surface; and a controller which controls the actuator, wherein:

after a type of the optical disc is determined, when a signal to be generated corresponding to an amount of reflected light from the optical disc decreases to a signal level below a threshold level and a time after a time point at which the signal level of the signal becomes equal to the threshold level exceeds a reference waiting time, the controller controls the actuator to move the objective lens in a direction such that a distance from the optical disc surface to the objective lens increases; and the reference waiting time is set based on at least either information of the type of the optical disc or information of a recording or reproducing speed of the optical disc.

8. A control method for moving an objective lens in an optical disc apparatus, comprising the steps of:

irradiating an optical disc with a laser beam from a laser diode through the objective lens;

receiving reflected light from the optical disc and generating a signal corresponding to an amount of the reflected light with an optical receiver section;

controlling an actuator with a controller and moving the objective lens relative to an optical disc surface, wherein:

after a type of the optical disc is determined, when a signal to be generated corresponding to an amount of reflected light from the optical disc decreases to a signal level below a threshold level and a time after a time point at which the signal level of the signal becomes equal to the threshold level exceeds a reference waiting time, the controller controls the actuator to move the objective lens in a direction such that a distance from the optical disc surface to the objective lens increases; and the reference waiting time is set based on at least either information of the type of the optical disc or information of a recording or reproducing speed of the optical disc.

* * * * *